(12) United States Patent
Smith et al.

(10) Patent No.: US 11,598,428 B2
(45) Date of Patent: Mar. 7, 2023

(54) VALVE ASSEMBLY AND METHOD

(71) Applicant: G.W. Lisk Company, Inc., Clifton Springs, NY (US)

(72) Inventors: Brian Smith, Walworth, NY (US); Daniel Meath, Clifton Springs, NY (US); Stephen Muscarella, West Henrietta, NY (US)

(73) Assignee: G.W. Lisk Company, Inc., Clifton Springs, NY (US)

(*) Notice: Subject to any disclaimer, the term of this patent is extended or adjusted under 35 U.S.C. 154(b) by 0 days.

(21) Appl. No.: 17/274,630

(22) PCT Filed: Sep. 10, 2019

(86) PCT No.: PCT/US2019/050287
§ 371 (c)(1),
(2) Date: Mar. 9, 2021

(87) PCT Pub. No.: WO2020/055781
PCT Pub. Date: Mar. 19, 2020

(65) Prior Publication Data
US 2022/0049772 A1 Feb. 17, 2022

Related U.S. Application Data

(60) Provisional application No. 62/729,207, filed on Sep. 10, 2018.

(51) Int. Cl.
*F16K 1/22* (2006.01)
*F02M 26/38* (2016.01)
(Continued)

(52) U.S. Cl.
CPC ............. *F16K 1/222* (2013.01); *F02M 26/38* (2016.02); *F02M 26/70* (2016.02); *F16K 1/223* (2013.01); *F16K 27/0218* (2013.01)

(58) Field of Classification Search
CPC ...... F16K 1/222; F16K 1/223; F16K 27/0218; F02M 26/38; F02M 26/70
(Continued)

(56) References Cited

U.S. PATENT DOCUMENTS

| | | |
|---|---|---|
| 3,879,938 A | 4/1975 | Rinker et al. |
| 4,622,931 A | 11/1986 | Wickramasuriya |

(Continued)

FOREIGN PATENT DOCUMENTS

| | | |
|---|---|---|
| AU | 6920296 A | 4/1997 |
| CN | 103238016 A | 8/2013 |

(Continued)

OTHER PUBLICATIONS

International Search Report of PCT/US2019/050287, completed Oct. 11, 2019, dated Nov. 12, 2019.

*Primary Examiner* — John Bastianelli
(74) *Attorney, Agent, or Firm* — Timothy W. Menasco, Esq.; Harter Secrest & Emery LLP

(57) ABSTRACT

Embodiments of the present disclosure present a valve assembly that includes a valve body having a gas passage bore, a valving bore extending along a longitudinal axis and intersecting the gas passage bore, a first bearing surface concentric with the longitudinal axis and a radially spaced apart second bearing surface concentric with the longitudinal axis, wherein an interface of the gas passage bore and the valving bore defines a flow port radially intermediate the first bearing surface and the second bearing surface. The valve assembly further includes a shaft valve extending along the longitudinal axis and rotatably mounted in the valving bore.

15 Claims, 11 Drawing Sheets

(51) Int. Cl.
*F02M 26/70* (2016.01)
*F16K 27/02* (2006.01)

(58) Field of Classification Search
USPC .......................... 251/305–308; 123/336–337
See application file for complete search history.

(56) References Cited

U.S. PATENT DOCUMENTS

| | | | |
|---|---|---|---|
| 6,062,205 A | 5/2000 | Bevan et al. | |
| 7,162,997 B2 * | 1/2007 | Madeira | F02M 35/10085 |
| | | | 123/336 |
| 7,255,082 B2 * | 8/2007 | Zajac | F01L 13/0015 |
| | | | 123/190.12 |
| 7,637,106 B2 * | 12/2009 | Hertweck | F02B 37/22 |
| | | | 60/602 |
| 2001/0032600 A1 | 10/2001 | Minegishi et al. | |
| 2006/0243229 A1 | 11/2006 | Zajac | |
| 2007/0051913 A1 | 3/2007 | Torii et al. | |
| 2008/0072865 A1 | 3/2008 | Baldson | |
| 2018/0023460 A1 | 1/2018 | Mawer et al. | |

FOREIGN PATENT DOCUMENTS

| | | | |
|---|---|---|---|
| CN | 105051363 A | | 11/2015 |
| EP | 0887541 A2 | | 12/1998 |
| JP | S611986101620 A | | 5/1986 |
| JP | H101998288041 A | | 10/1998 |
| JP | 200132728 A | | 2/2001 |
| WO | 9811336 A1 | | 3/1998 |
| WO | WO 2016126237 A1 * | | 11/2016 |

* cited by examiner

1702: (a) providing valve body having a gas passage bore, a valving bore extending along a longitudinal axis and intersecting the gas passage bore, a first bearing surface concentric with the longitudinal axis and a radially spaced apart second bearing surface concentric with the longitudinal axis, wherein an interface of the gas passage bore and the valving bore defines a flow port radially intermediate the first bearing surface and the second bearing surface; and (b) providing a shaft valve extending along the longitudinal axis and rotatably mounted in the valving bore, the shaft valve having a first peripheral contact surface configured to engage the first bearing surface, a second peripheral contact surface configured to engage the second bearing surface and a vane radially intermediate the first peripheral contact surface and the second peripheral contact surface, wherein the first and the second peripheral contact surfaces have a given diameter and the vane encompasses the given diameter and wherein rotation of the shaft valve relative to the valve body selectively permits flow through the gas passage bore 1704: wherein the valve body defines a pair of opposing sealing bands extending parallel to the longitudinal axis, each sealing band configured to engage a corresponding longitudinal edge of the vane.

1706: wherein the sealing bands have one of (i) a V-shaped edge adjacent a channel defined in the valve body operable to allow a flow to pass therethrough, (ii) a rectangular shaped edge, and (iii) an oval shaped edge 1708: wherein the first peripheral contact surface configured to engage the first bearing surface and the second peripheral contact surface configured to engage the second bearing surface are operable to contact accumulated combustion products disposed on an edge of the sealing bands.

1710: wherein the first peripheral contact surface configured to engage the first bearing surface and wherein the shaft valve is operable to rotate unobstructed 360 degrees within the valving bore

FIG. 17

VALVE ASSEMBLY AND METHOD

BACKGROUND

Field of the Disclosure

The present disclosure relates to valves and particularly to flow control including gas flow control and more particularly to butterfly type valves.

Description of Related Art

A valve is a device that is able to regulate or control the flow of a gas, liquid and/or particulates by opening and closing a channel or passageway. When a valve is in the open position, fluid is typically able to flow in a direction from high pressure to low pressure. When a valve is in the closed position, fluid flow is typically obstructed from flowing.

SUMMARY OF THE DISCLOSURE

In view of the foregoing, it is an object of the present disclosure to provide a method and apparatus.

A first exemplary embodiment of the present disclosure provides a valve assembly. The valve assembly includes a valve body having a gas passage bore, a valving bore extending along a longitudinal axis and intersecting the gas passage bore, a first annular bearing surface concentric with the longitudinal axis and a radially spaced apart second annular bearing surface concentric with the longitudinal axis, wherein an interface of the gas passage bore and the valving bore defines a flow port radially intermediate the first bearing surface and the second bearing surface. The valve assembly further includes a shaft valve extending along the longitudinal axis and rotatably mounted in the valving bore, the shaft valve having a first peripheral contact surface configured to engage the first bearing surface, a second peripheral contact surface configured to engage the second bearing surface and a vane radially intermediate the first peripheral contact surface and the second peripheral contact surface, wherein the first and the second peripheral contact surfaces have a given diameter and the vane encompasses the given diameter and wherein rotation of the shaft valve relative to the valve body selectively permits flow through the gas passage bore.

A second exemplary embodiment of the present disclosure provides an exhaust gas recirculation valve. The exhaust gas recirculation valve includes a valve body having a gas passage bore extending between at least one inlet and an at least one outlet, wherein the at least one inlet is configured to receive an exhaust gas from an exhaust manifold of an internal combustion engine and the at least one outlet is configured to pass exhaust to an inlet manifold of the internal combustion engine, the gas passage bore including a first inlet gas passage extending from the at least one inlet, the valve body having a valving bore intersecting the first inlet gas passage, the valving bore defining a first circular bearing surface and a second annular bearing surface. The exhaust gas recirculation valve further includes a shaft valve slideably received within the valving bore, the shaft valve having a first contact surface for rotatably engaging the first circular bearing surface and a second contact surface for rotatably engaging the second circular bearing surface, and a vane, wherein the first contact surface, the second contact surface and the vane have a common diameter.

A third exemplary embodiment of the present disclosure provides a method. The method includes providing a valve body having a gas passage bore, a valving bore extending along a longitudinal axis and intersecting the gas passage bore, a first annular bearing surface concentric with the longitudinal axis and a radially spaced apart second annular bearing surface concentric with the longitudinal axis, wherein an interface of the gas passage bore and the valving bore defines a flow port radially intermediate the first bearing surface and the second bearing surface. The method further includes providing a shaft valve extending along the longitudinal axis and rotatably mounted in the valving bore, the shaft valve having a first peripheral contact surface configured to engage the first bearing surface, a second peripheral contact surface configured to engage the second bearing surface and a vane radially intermediate the first peripheral contact surface and the second peripheral contact surface, wherein the first and the second peripheral contact surfaces have a given diameter and the vane encompasses the given diameter and wherein rotation of the shaft valve relative to the valve body selectively permits flow through the gas passage bore.

A fourth exemplary embodiment of the present disclosure provides a method. The method includes forming a valve body having a gas passage bore extending between at least one inlet and an at least one outlet, wherein the at least one inlet is configured to receive an exhaust gas from an exhaust manifold of an internal combustion engine and the at least one outlet is configured to pass exhaust to an inlet manifold of the internal combustion engine, the gas passage bore including a first inlet gas passage extending from the at least one inlet, the valve body having a valving bore intersecting the first inlet gas passage, the valving bore defining a first circular bearing surface and a second annular bearing surface. The method further includes forming a shaft valve slideably received within the valving bore, the shaft valve having a first contact surface for rotatably engaging the first circular bearing surface and a second contact surface for rotatably engaging the second circular bearing surface, and a vane, wherein the first contact surface, the second contact surface and the vane have a common diameter.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF SEVERAL VIEWS OF THE DRAWINGS

FIG. 17 is an exemplary logic flow diagram in accordance with a method for practicing exemplary embodiments of this disclosure.

DETAILED DESCRIPTION OF THE DISCLOSURE

Embodiments of the present disclosure can be used in exhaust gas recirculating valves (EGR) connected to exhaust manifolds 101 of a combustion engine 103 (shown in FIG. 1) to divert metered amounts of the exhaust gas to intake manifolds 105 for re-burn by the engine. The exhaust gases are mixed with fresh air/fuel mixtures resulting in a lowering of combustion temperature and a reduction in the formation of harmful compounds such as nitrous oxide. Embodiments of the present disclosure provide a valve body and a single piece shaft valve having a vane with butterfly plate flow geometry. The diameter of the single piece shaft valve is relatively uniform throughout its longitudinal axis including the vane portion of the shaft valve.

It is contemplated that embodiments of the present disclosure can be used in place of traditional butterfly valves. In this embodiment, the valve will include a body having a relatively large-diameter first bore there through for passage of a gas, and a second relatively small-diameter bore transverse to the first bore for supporting a rotatable shaft on which is mounted a valve plate (known in the art as a "butterfly") for controllably occluding the first bore in response to rotation of the shaft to control the flow of gas.

Embodiments of the valve of the present disclosure include a valve body and a shaft valve rotatably connected to the valve body.

Valve Body

Figure 1:
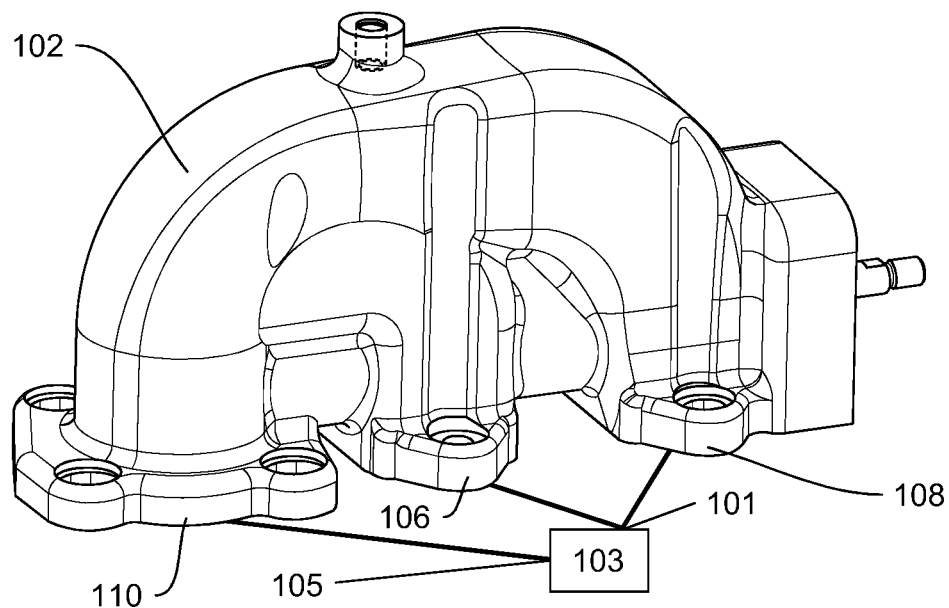
FIG. 1 is an exterior view of an exemplary valve body and shaft valve suitable for use in practicing exemplary embodiments of this disclosure.
Figure 2:
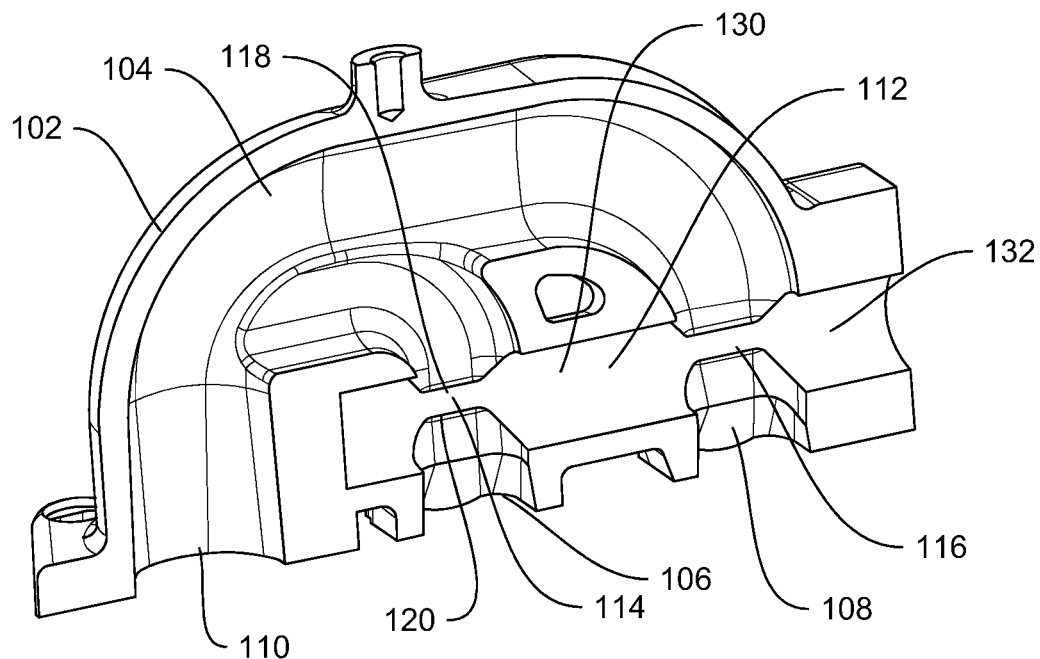
FIG. 2 is a cross-sectional view of an exemplary valve body suitable for use in practicing exemplary embodiments of this disclosure.

Referring to FIGS. 1 and 2, shown is a valve body 102, which includes a gas passage bore 104 extending between an inlet and an outlet. It is contemplated in some configurations, the gas passage bore 104 will include a plurality of inlets or a plurality of outlets. As seen in FIG. 2, the valve body 102 includes two gas inlet passages 106, 108 and a combined gas outlet passage 110. The two exhaust gas inlet passages 106, 108 admit exhaust gases from an engine exhaust manifold 101. The exhaust gas outlet passage 110 directs a metered flow of the exhaust gases toward an engine inlet manifold 105.

The gas passage bore 104 can have any of a variety of cross sectional profiles (e.g., circular, oval, rectangular, triangular, etc), wherein the profile is constant or varies along a length of the bore.

The valve body 102 also includes a cylindrical valving bore 112 extending along a longitudinal axis and intersecting the gas passage bore 104. As seen in FIG. 2, the valving bore 112 extends through both inlet passages 106, 108 of the gas passage bore 104.

Each intersection of the valving bore 112 and the gas passage 104 defines a corresponding flow path cross sectional area.

Thus, the gas passage bore 104 can have a circular, obround, oval, rectilinear or faceted periphery, either at the intersection with the valving bore 112, as well as upstream or downstream of the valving bore 112.

A common or overlapping portion of the gas passage bore 104 and the valving bore 112 defines a sealing band 114, 116 on opposite sides of the valving bore 112, wherein the sealing bands 114, 116 extend parallel to the longitudinal axis. As the valving bore 112 has a circular cross section, the sealing bands 114, 116 have a generally arcuate cross section taken perpendicular to the longitudinal axis. Thus, the sealing bands 114, 116 have a circumferential dimension about the longitudinal axis (shown in FIGS. 7, 10, 11 and 14). The sealing bands 114, 116 extend about the periphery of the valving bore 112 as well as extending parallel to the longitudinal axis. In the configuration having a plurality of inlet passages (shown in FIG. 2), each intersection of the gas inlet passage 106, 108 and the valving bore 112 includes a pair of opposing sealing bands 114, 116.

As set forth below, the sealing bands 114, 116 can be defined by parallel edges 118, 120, each parallel to the longitudinal axis. Alternatively, the sealing bands 114, 116 can include cut outs or a shaped edge 122, 124 (shown in FIG. 11) so that flow can be permitted or precluded (depending on the shaping) relative to an adjacent portion of the sealing band 114, 116. That is, the sealing band 114, 116 can have varying circumferential dimension along the longitudinal axis. For example, one end of the sealing band 114, 116 may have a circumferential dimension of 0.5 cm (or an arc of 3 degrees) and the other end of the sealing band may have a circumferential dimension of 0.25 cm (or an arc of 1.5 degrees). As set forth below, this shaping can provide for increased low flow control of the valve. Additionally, the curvature of sealing bands 114, 116 provide a larger flow area than gas bore passage 104 allowing for increased flow over sealing bands 114, 116.

Figure 14:
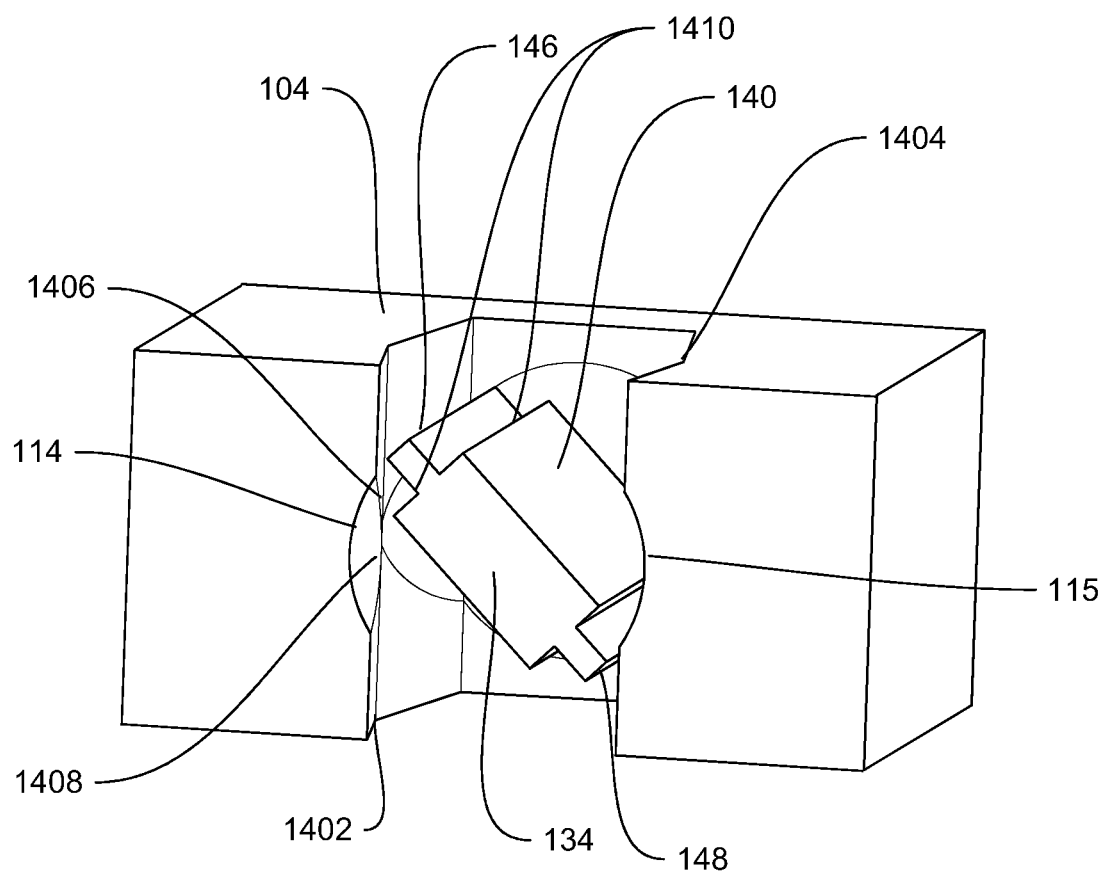
FIG. 14 is another perspective cross-sectional view of an exemplary valve body and shaft valve suitable for use in practicing exemplary embodiments of this disclosure.
Figure 15:
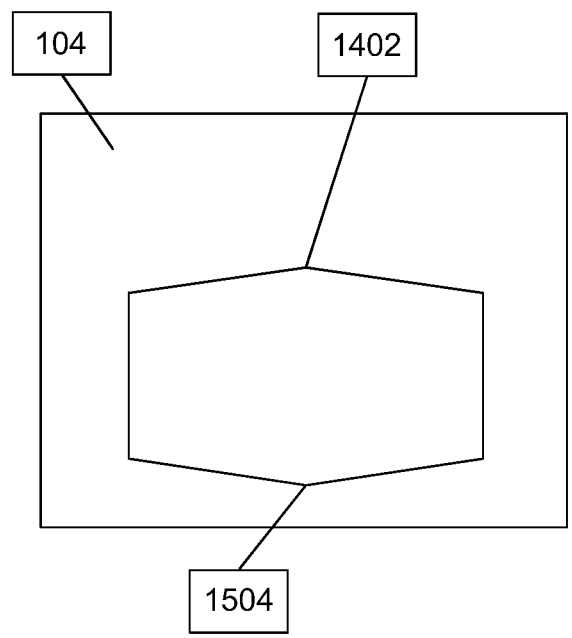
FIG. 15 is a top view of the shape of the gas passage intersection with the valving bore suitable for use in practicing exemplary embodiments of this disclosure.

In conjunction with the shaping of the sealing band 114, 116, the valve body 102 can include fluting or channels 126, 128 (shown in FIG. 11) that extend from the sealing band 114 along the gas passage 104. The valve body 102 can also include triangular or V-shaped channels 1402, 1404 (shown in FIG. 14). In these embodiments, the terminal edge of channels 126, 128 or the terminal edge 1406, 1408 of V-shaped channels 1402, 1404 are adjacent to the sealing bands 114, 116 and do not terminate at the same rotational location of the valve shaft 140. Rather, the terminal edge 1406, 1408 is also V-shaped such that it sealing bands 114, 116 terminate at different rotational locations of the valve shaft 140. A cross sectional top view of the valve body 104 at FIG. 15 illustrates the V-shaped channels 1402, 1404.

Figure 16:
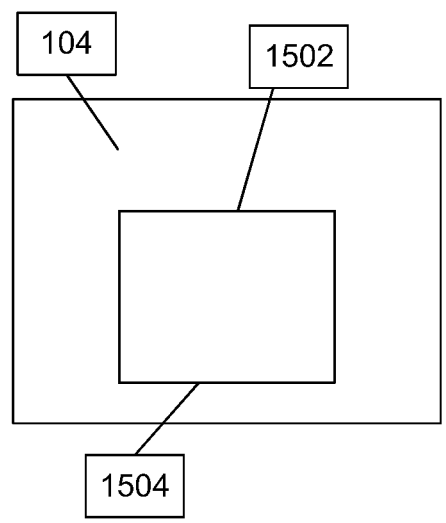
FIG. 16 is another top view of the shape of the gas passage intersection with the valving bore suitable for use in practicing exemplary embodiments of this disclosure.

In another embodiment, the valve body 102 can have a substantially flat surface 1502, 1504 adjacent the sealing bands 114, 116, and does not include channels 126, 128. This embodiment is shown in FIG. 16, which depicts another cross sectional top view of valve body 104.

The valving bore 112 also defines at least two or more bearing surfaces 130, 132 (shown in FIG. 2). As part of the valving bore 112, the bearing surfaces 130, 132 have the same diameter as the valving bore 112. The bearing surfaces 130, 132 are interfacing surfaces for supporting rotation of the shaft valve 134 relative to the valve body 102. The bearing surfaces 130, 132 are cylindrical in shape and have a diameter to provide for operable rotation of the shaft valve 134 relative to the valve body 102.

Shaft Valve

Figure 3:
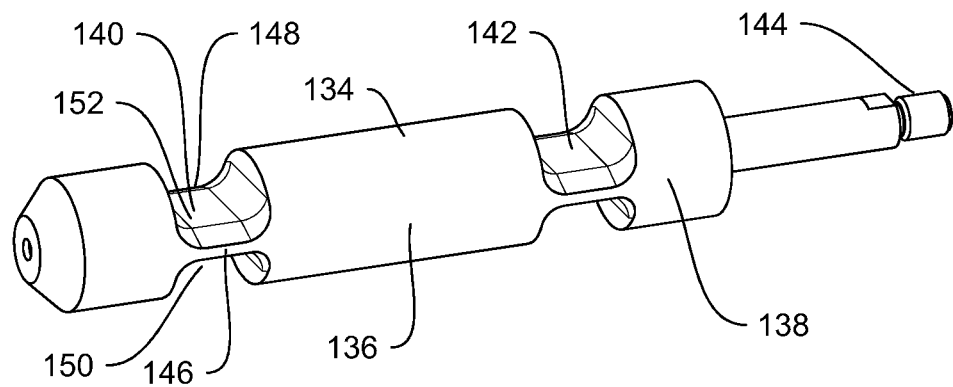
FIG. 3 is a perspective view of an exemplary shaft valve suitable for use in practicing exemplary embodiments of this disclosure.
Figure 4:
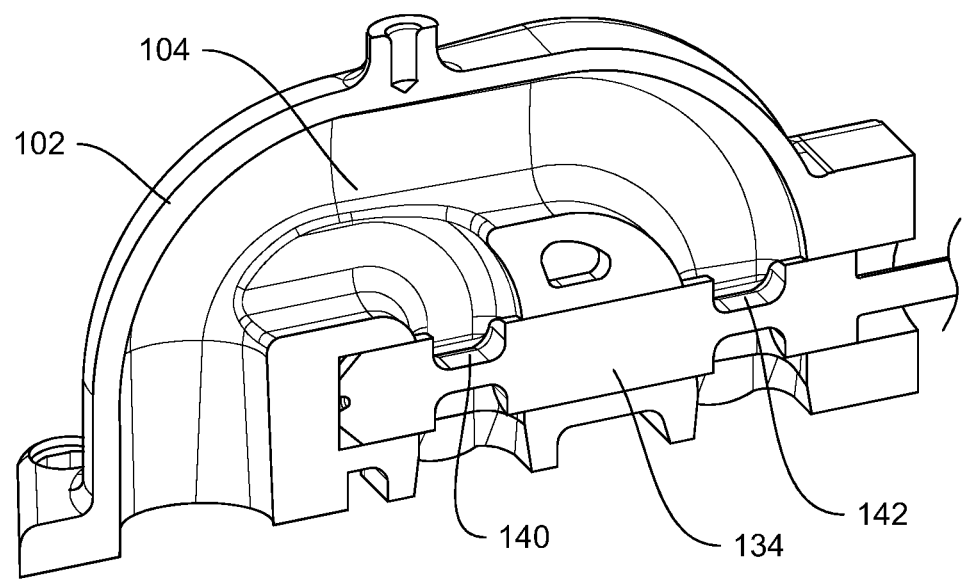
FIG. 4 is a cross-sectional view of an exemplary valve body and shaft valve suitable for use in practicing exemplary embodiments of this disclosure.

The shaft valve 134 (shown in FIG. 3 and FIG. 4) is a cylindrical member having a given diameter sized to be slideably received within the valving bore 112 and rotatably retained within the valving bore 112.

The shaft valve 134 includes at least a first peripheral contact surface 136 configured to engage the first bearing surface 130, a second peripheral contact surface 138 configured to engage the second bearing surface 132. As seen in the figures, the shaft valve 134 can include a third, or additional, peripheral contact surfaces for rotatably engaging corresponding surfaces of the valve body 102.

The peripheral contact surfaces 136, 138 define a maximum diameter of the shaft valve 134. Except for the vanes 140, 142, it is contemplated that other peripheral sections of the shaft valve 134 can have a slightly reduced diameter to facilitate operably locating the shaft valve 134 within the valving bore 112 and reduce rotating friction between the shaft valve 134 and the valve body 102. However, excluding vanes 140, 142, it should be appreciated that embodiments of the shaft valve 134 include shaft valve 134 having a relatively uniform diameter throughout its longitudinal axis.

The sizing of the diameter of the shaft valve 134 to the valving bore 112 (and hence bearing surfaces 130, 132) is selected in accordance with standard engineering practices to permit the shaft valve 134 to be slid into the valving bore 112 and permit rotation of the shaft valve 134 relative to the valve body 102. The diameter of the shaft valve 134 relative to the valving bore 112 is selected to permit rotation and accommodate tolerances of normal manufacturing processes. It should be appreciated that the shaft valve 134 is sized to valving bore 112 such that except for gas allowed to flow over the sealing surfaces and peripheral contact surfaces 136, 138 when the shaft valve 134 is in the open position allowing gas to flow through gas passage bore 104, gas is substantially obstructed from flowing between the shaft valve 134 and valving bore 112.

As seen in the figures, the shaft valve 134 can include a length of reduced diameter to form a shank 144 for engaging a drive or control mechanism for selectively imparting rotation of the shaft valve 134 relative to the valve body 102. The shank 144 can include a faceted portion or a flat or flats, keyways or splines, or any other shape to cooperatively engage with the drive or control mechanism. The drive or control mechanism can be any of a variety of configurations including an engine control module (ECM) and an electric, electromechanical or hydraulic motor.

The shaft valve 134 also includes a vane 142 longitudinally intermediate the first peripheral contact surface 136 and the second peripheral contact surface 138. As seen in the figures, the shaft valve 134 can include a number of vanes 140, 142 corresponding to the number of gas passage bores 104.

The vanes 140, 142 are configured to selectively engage the sealing bands 114, 116 to preclude (maximally inhibit) flow through the respective gas passage 114, 116. That is, each edge of the vane 140, 142 includes a seal face 146, 148, wherein the distance between the seal faces 146, is the diameter of the shaft valve 134.

The vanes 140, 142 are generally defined by a pair of opposite recesses 150, 152 in the shaft valve 134. Thus, by rotation of the shaft valve 134 relative to the valve body 102, the vane 140 moves from a sealed orientation with each seal faces 146, 148 engaging a corresponding sealing band 114, 115 of the valve body 102 to a fully open position parallel to the flow.

The sealing bands 114, 116 can have any of a variety of configurations and dimensions. For example, by forming the sealing bands 114, 116 to have a circumferential dimension that is greater, such as by 1.1, 1.4, 1.6 or more times a dimension of the seal face 146, 148 of the vane 140, 142.

Figure 7:
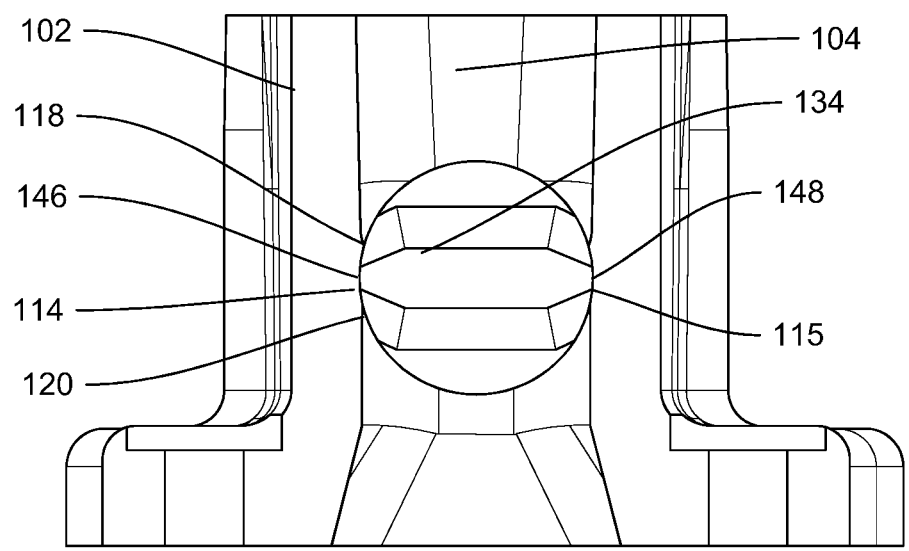
FIG. 7 is a front cross-sectional view of an exemplary valve body and shaft valve suitable for use in practicing exemplary embodiments of this disclosure.
Figure 10:
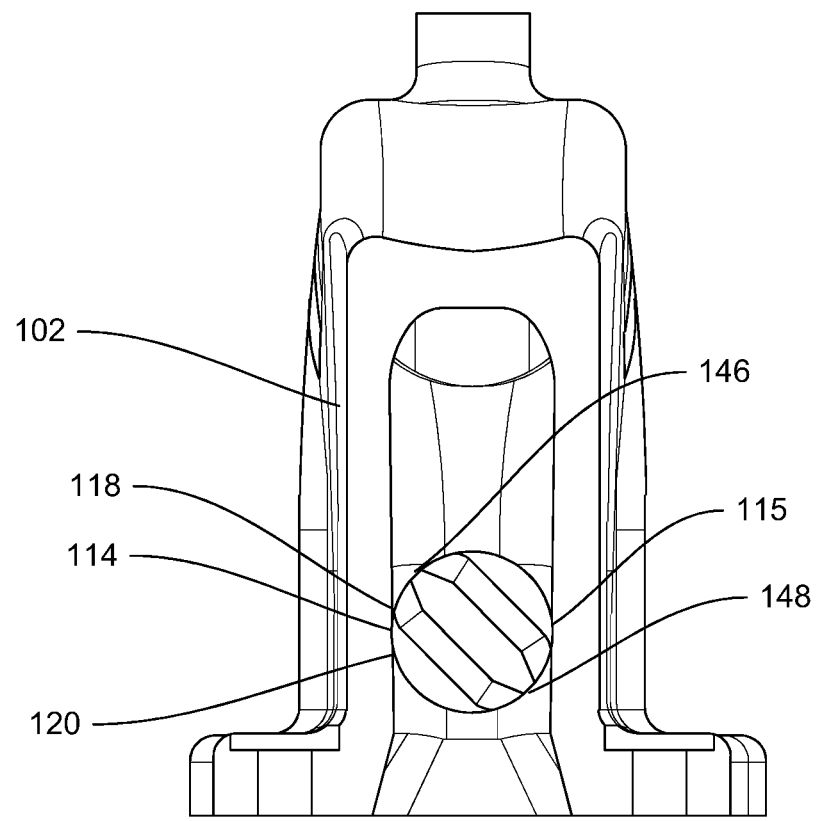
FIG. 10 is another front cross-sectional view of an exemplary valve body and shaft valve suitable for use in practicing exemplary embodiments of this disclosure.

The recesses 150, 152 forming the vane 140 can be configured to provide the vane 140 with a constant thickness across the diameter of the shaft valve 134 or a varying thickness across the shaft valve 134. As seen in FIGS. 7, 10, and 14, the vane 140 has a first thickness encompassing the longitudinal axis and a reduced or lesser thickness at the seal face 146, 148.

Figure 8:
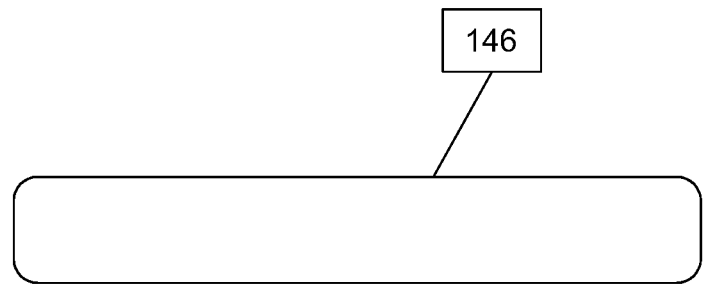
FIG. 8 is a side elevational view of a seal face suitable for use in practicing exemplary embodiments of this disclosure.
Figure 9:
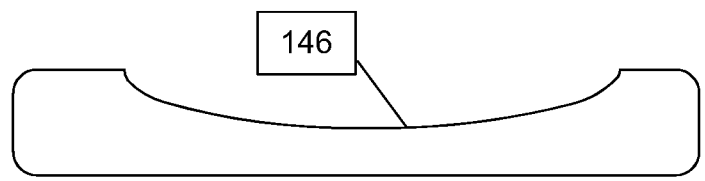
FIG. 9 is a side elevational view of a shaped seal face suitable for use in practicing exemplary embodiments of this disclosure.

Referring to FIGS. 7 and 10, the seal face 146, 148 is defined by generally parallel edges extending parallel to the longitudinal axis. That is, the seal face 146, 148 has a generally rectangular shape (though having a curvature corresponding to the cylindrical periphery of the shaft valve 134) (shown in FIGS. 8 and 9). However, as shown in the figures, it is possible to shape the seal face 146, 148 so that the seal face 146, 148 has a varied circumferential dimension wherein flow would be permitted along some of the vane 140 while remaining precluded from a different portion of the vane 140 as the vane 140 rotates relative to the valve body 102.

Similarly, the sealing band 114, 115 and corresponding seal face 146, 148 can be differently sized for a given vane 140. This further allows for customized flow control as for a predestined rotation of the shaft valve 134, gas can flow about one edge of the vane 140, while the remaining edge of the vane 140 precludes flow. Embodiments include the valve shaft 134 having a substantially flat sealing face 146, 148 as shown in FIG. 14. In the embodiment depicted in FIG. 14, vane 140 includes steps 1410, which allow for vane 140 to be formed through less costly manufacturing means. In this embodiment the shaft width (i.e., distance between sealing face 146 and sealing face 148 is slightly larger than the distance between sealing bands 114, 116 in order to create a sealed interface between the sealing faces 146, 148 and the sealing bands 114, 115 to prevent a flow of gas through the passage when the shaft valve 134 is in the closed position.

Figure 11:
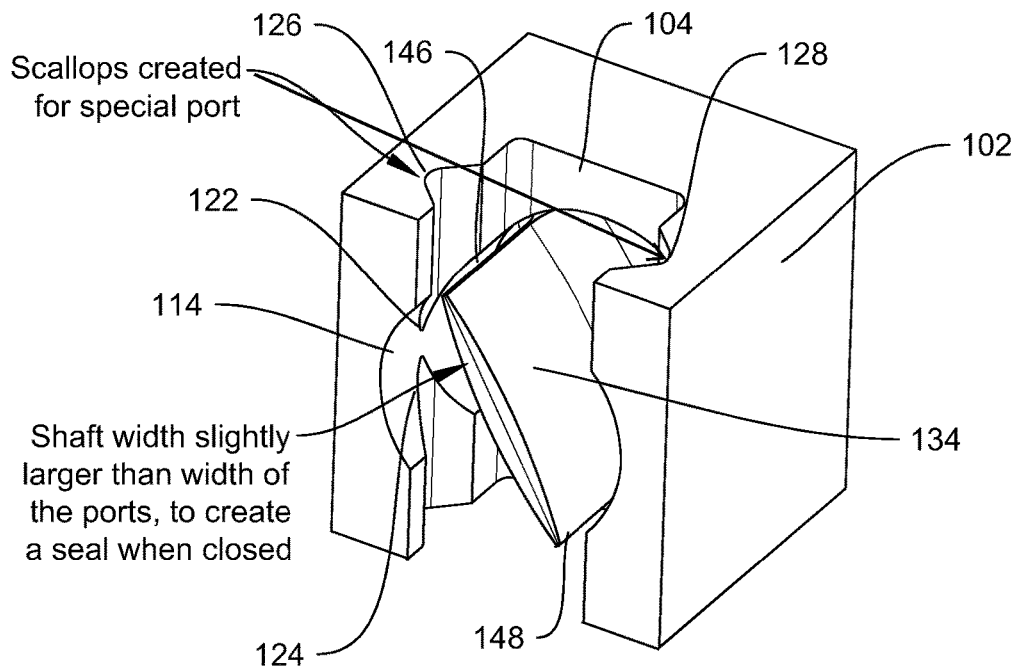
FIG. 11 is a perspective cross-sectional view of an exemplary valve body and shaft valve suitable for use in practicing exemplary embodiments of this disclosure.
Figure 12:
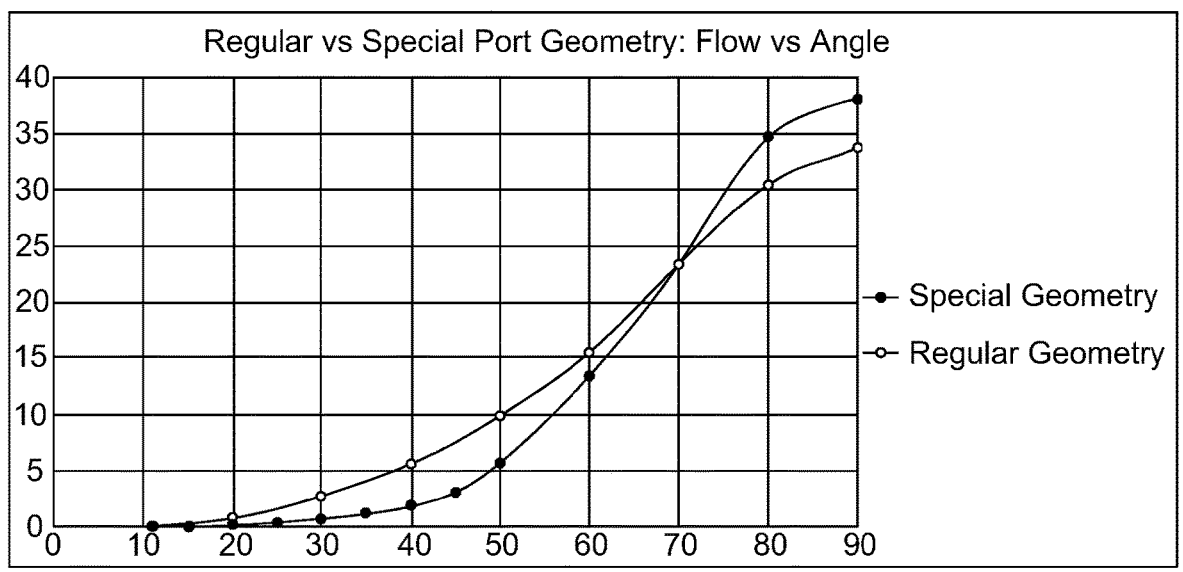
FIG. 12 is a graph illustrating flow rates through a gas passage vs. angular location of a shaft within the gas passage in accordance with exemplary embodiments of this disclosure.

By selecting the relative sizing of the sealing bands 114, 115 of the valve body 102 and the seal face 146, 148 of the vane 140, the shaft valve 134 can permit slight rotation of the vane 140 relative the valve body 102 without permitting flow. That is, the sensitivity of the shaft valve 134 to a zero or null position relative to the valve body 102 can be reduced. Similarly, the sensitivity of the shaft valve 134 through low angle rotations relative to the valve body 102 can be reduced. As seen in FIG. 11, approximately 5% of the flow can be controlled through approximately 50° of rotation. This is illustrated in the graph shown in FIG. 12, which depicts the overall percentage flow rate on the y-axis versus rotational degree of the shaft valve 134 on the x-axis.

The sizing of the sealing band 114, 115 and seal face 146, 148 provide an overlapping interface that allows for the elimination of a conventional end stop point, as well as the elimination of valve shut off point shift due to thermal expansion dimensional changes at operating temperatures up to 720° C. Indeed, embodiments include the absence of a mechanical or physical stop or obstruction within or adjacent to the sealing bands 114, 115 that prevent rotation of valve shaft 134. In other words, embodiments include valve shaft 134 being operable to rotate in multiple directions and to multiple degrees greater than 360 degrees in either direction (e.g., clockwise or counterclockwise).

Figure 5:
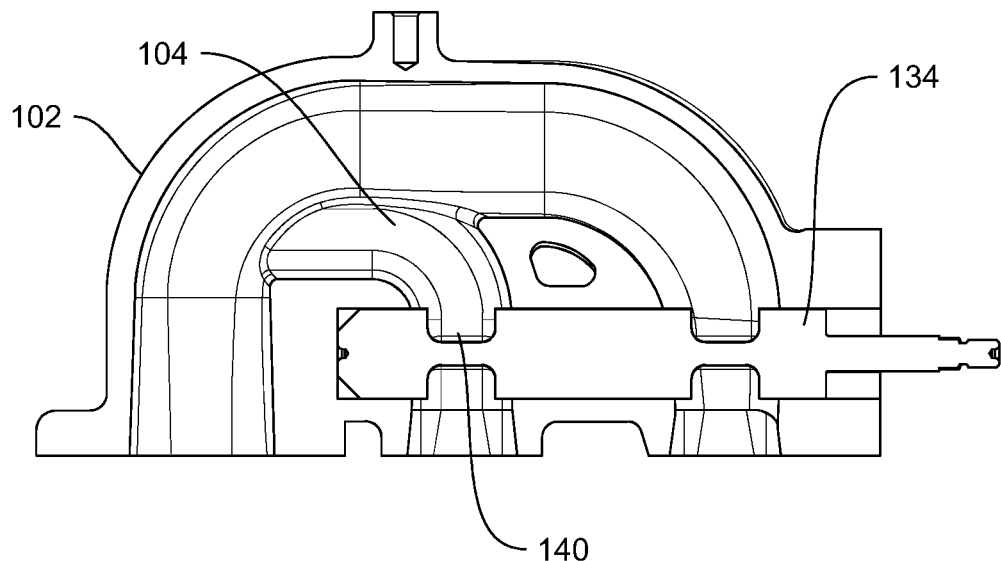
FIG. 5 is another cross-sectional view of an exemplary valve body and shaft valve suitable for use in practicing exemplary embodiments of this disclosure.
Figure 6:
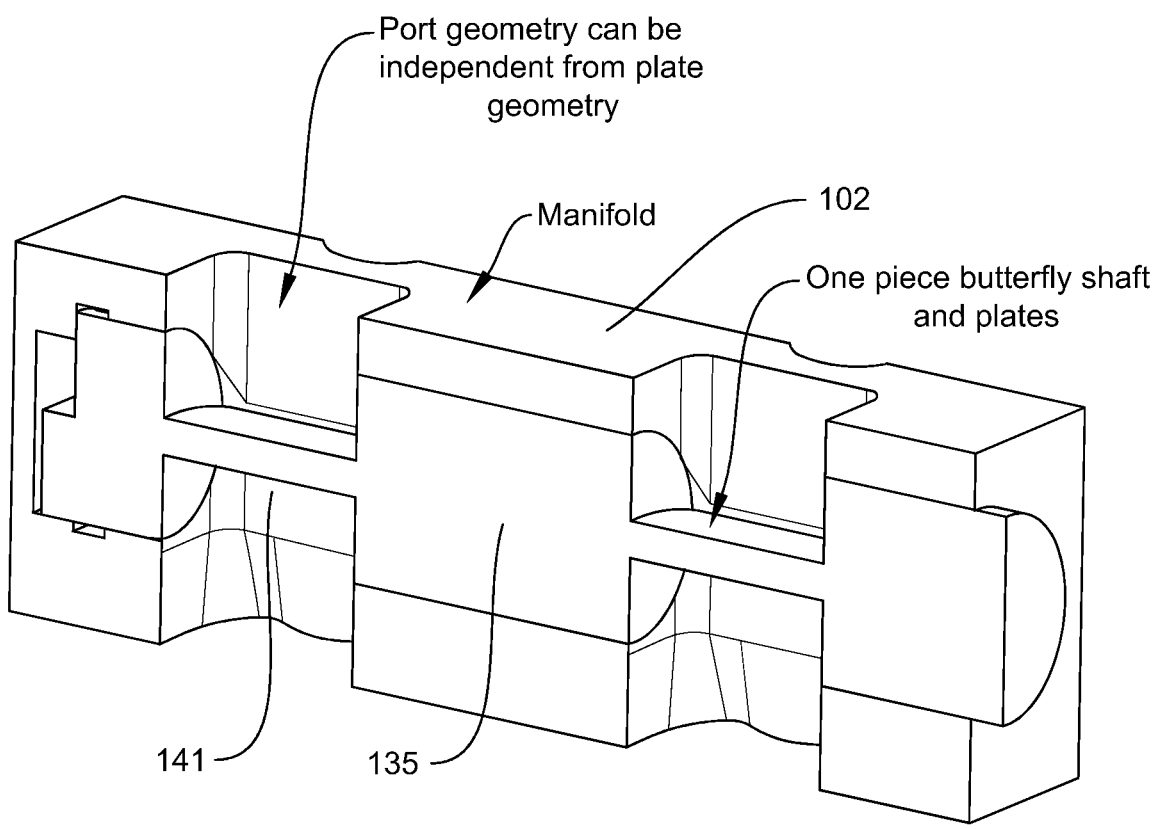
FIG. 6 is yet another cross-sectional view of an exemplary valve body and shaft valve suitable for use in practicing exemplary embodiments of this disclosure.

Referring to the figures, the shaft valve 134 can be used to set a maximum flow rate of the system. That is, by sizing the vane 140 to have a longitudinal dimension that is, for example 90%, 80% or 50% of the dimension of the gas passage bore 104 along the longitudinal axis, the shaft valve 134 can define a maximum flow path for the system. This allows the valve body 102, and corresponding gas passage bore 104 to be sized to accommodate a relatively large system requiring a relatively high flow rate, wherein the longitudinal dimension of the vane 140 matches the longitudinal dimension of the associated gas passage bore 104. However, since the shaft valve 134 can be readily replaced by merely sliding out a first shaft valve 135 having a vane 141 (shown in FIG. 6) and sliding in a second shaft valve 134, the second shaft valve 134 can have a vane 140 defined by a smaller longitudinal dimension, thereby restricting the maximum available flow rate of the valve. As shown in FIG. 6, the longitudinal dimension of vane 141 is coextensive with the longitudinal dimension of gas passage bore 104. Conversely, as shown in FIG. 5, the longitudinal dimension of vane 140 is smaller than the longitudinal dimension of gas passage bore 104. This allows a single size valve body 102 to be used in multiple operating environments.

As the shaft valve 134 can be used to limit the effective cross sectional area of the gas passage bore 104, customization of the system is achieved by merely exchanging shaft valves 134 of different vane 140 configurations. As seen in the figures the longitudinal dimension of the vane 140 can be less than the longitudinal dimension of the gas passage bore 104 at the interface with the valving bore 112. Thus, the shaft valve 134 effectively determines the available cross sectional flow area and hence flow rate.

Figure 13:
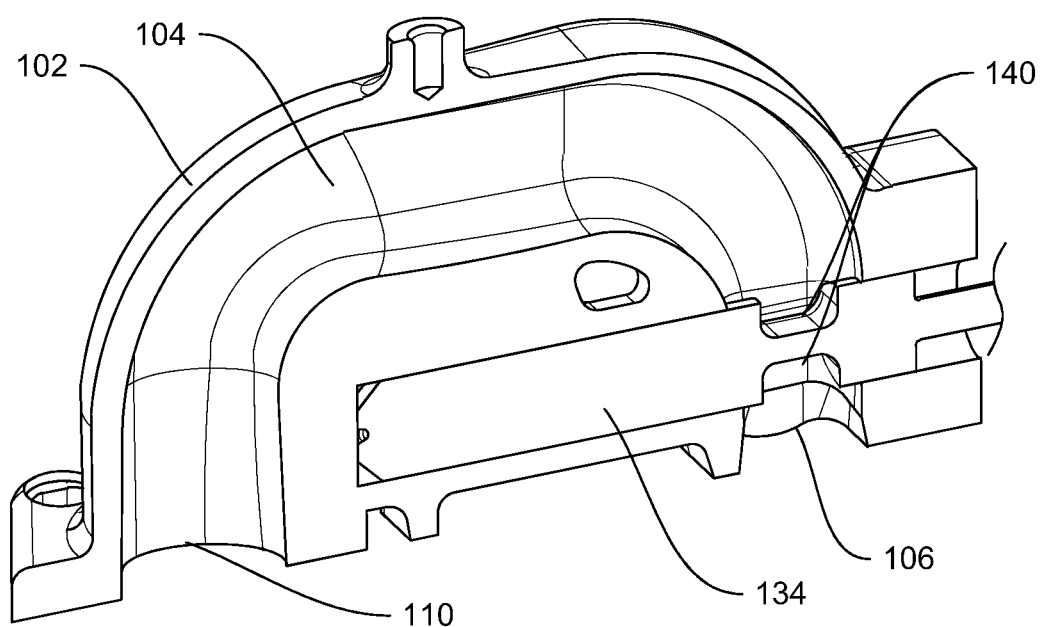
FIG. 13 is another embodiment of an exemplary valve body and shaft valve suitable for use in practicing exemplary embodiments of this disclosure.

It should be appreciated that while embodiments of the present valve assembly include a valve body 102 having two gas inlet passages 106, 108 and a single gas outlet passage 110 (shown in FIG. 2), embodiments of valve body 102 include a single gas inlet passage 106 and a single gas outlet passage 110 (shown in FIG. 13). In this embodiment, shaft valve 134 includes a single vane 140 configured to selectively engage the sealing bands 114, 115 to preclude flow through the gas passage 104.

The presented embodiments offer significant advantages. These advantages include a reduced number of parts which lowers manufacturing costs as well as reduces the necessary steps for assembly. Further, as set forth above, the shaft valve 134 can be replaced by merely sliding the old shaft valve 134 out of the valve body 102 and sliding the new shaft valve 134 into the valve body 102, both component cost and assembly cost are reduced. Also, as the number of parts is reduced, the necessary accounting for accumulated tolerances is reduced, thereby increasing manufacturing pass rates.

The ability of the present system to confront an area of the sealing band 114, 115 with an area of the seal face 146, 148, rather than line contacts of the prior designs, the present system can reduce leakage from approximately 30 Kg-40 Kg/hr to less than 10 Kg/hr and in select configurations less than 1 Kg/hr. This reduced leakage is believed to be necessary to meet more stringent emissions standards being adopted globally.

Because the contact surfaces of the shaft valve 134 have the same diameter as the vane 140, the load on the bearing surfaces is less than in a traditional butterfly valve. In certain configurations, the bearing load is decreased by a factor of 4. As there is reduced bearing load, alternative (and cheaper) materials can be used for the valve body 102 as well as the shaft valve 134. Thus, less exotic materials for the valve body 102 and shaft valve 134 are required.

The shaped sealing band 114, 115 in conjunction with the channels 126, 128 in the valve body 102 provides for the configuration of the port, such as the "V" shape shown in FIG. 11, which improves a shearing action of accumulated combustion materials, such as soot and carbon. The improved shearing results from the seal face 146, 148 of the vane 140 progressively coming into engagement with the sealing band 114, 115, rather than the entire seal face 146, 148 engaging the entire sealing band 114, 115 at one time. By progressively engaging, a lower torque control motor or drive can be used. The lower torque motor is less costly and typically adds less weight to the vehicle in which the present valve is installed. It should be appreciate that while FIGS. 11, 14, and 15 depict "V" shaped channels 126, 128, embodiments of channels 126, 128 can be shaped to include rectangular (shown in FIG. 16), circular, oval (shown in FIG. 9 as sealing face 146) or multiple "V" shaped channels in order to allow for different types of flow rate control through gas bore passage 104.

As set forth above, the shaped sealing band and/or seal face which provide for the port configuration options such as "V" or other shapes change flow output versus angular rotation of the shaft valve 134. This allows customization of the valve output flow for improved sensitivity at lower opening angles of the valve improving valve response. Additionally, the "V" shaped channels 126, 128 not only allows for finer adjustments in the amount of flow through gas bore passage 104, but channels 126, 128 allow for finer adjustments in the velocity of flow through gas bore passage 104. That is, rotation of valve shaft 134 allowing flow through only channels 126, 128 will have a higher flow velocity when compared to the flow velocity when the sealing face 146, 148 is no longer in contact with any portion of the sealing band 114, 115.

Also, the use of the shaft valve 134 provides flexibility to adjust maximum flow output by adjusting the machine depth or width of the recesses or cut outs in the shaft valve 134 as well as the number of cut outs without changing the package size or port configuration in the valve body 102.

Reference is now made to FIG. 17, which presents an exemplary method or process for providing embodiments of the present disclosure. The process begins at block 1702, which states (a) providing valve body having a gas passage bore, a valving bore extending along a longitudinal axis and intersecting the gas passage bore, a first bearing surface concentric with the longitudinal axis and a radially spaced apart second bearing surface concentric with the longitudinal axis, wherein an interface of the gas passage bore and the valving bore defines a flow port radially intermediate the first bearing surface and the second bearing surface; and (b) providing a shaft valve extending along the longitudinal axis and rotatably mounted in the valving bore, the shaft valve having a first peripheral contact surface configured to engage the first bearing surface, a second peripheral contact surface configured to engage the second bearing surface and a vane radially intermediate the first peripheral contact surface and the second peripheral contact surface, wherein the first and the second peripheral contact surfaces have a given diameter and the vane encompasses the given diameter and wherein rotation of the shaft valve relative to the valve body selectively permits flow through the gas passage bore. Following block 1702, block 1704 indicates wherein the valve body defines a pair of opposing sealing bands extending parallel to the longitudinal axis, each sealing band configured to engage a corresponding longitudinal edge of the vane.

Some of the other non-limiting embodiments include block 1706, which specifies wherein the sealing bands have one of (i) a V-shaped edge adjacent a channel defined in the valve body operable to allow a flow to pass therethrough, (ii) a rectangular shaped edge, and (iii) an oval shaped edge. Next, block 1708 states wherein the first peripheral contact surface configured to engage the first bearing surface and the second peripheral contact surface configured to engage the second bearing surface are operable to contact accumulated combustion products disposed on an edge of the sealing bands. Block 1710 indicates wherein the first peripheral contact surface configured to engage the first bearing surface and wherein the shaft valve is operable to rotate unobstructed 360 degrees within the valving bore.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method comprising:
   (a) providing valve body having a gas passage bore, a valving bore extending along a longitudinal axis and intersecting the gas passage bore, a first bearing surface concentric with the longitudinal axis and a radially spaced apart second bearing surface concentric with the longitudinal axis, wherein an interface of the gas passage bore and the valving bore defines a flow port radially intermediate the first bearing surface and the second bearing surface; and
   (b) providing a shaft valve extending along the longitudinal axis and rotatably mounted in the valving bore, the shaft valve having a first peripheral contact surface configured to engage the first bearing surface, a second peripheral contact surface configured to engage the second bearing surface and a vane radially intermediate the first peripheral contact surface and the second peripheral contact surface, wherein the first and the second peripheral contact surfaces have a given diameter and the vane encompasses the given diameter and wherein rotation of the shaft valve relative to the valve body selectively permits flow through the gas passage bore, wherein the valve body defines a pair of opposing sealing bands extending parallel to the longitudinal axis, each sealing band configured to engage a corresponding longitudinal edge of the vane, and wherein the sealing bands have a sealing diameter that is greater than a length of the longitudinal edge of the vane, and wherein the shaft valve and the valve body are operable to prevent a flow of gas between the shaft valve and the valve body when the longitudinal edge of the vane is in contact with the sealings bands.

2. The method of claim 1, wherein the valve body defines a pair of opposing sealing bands extending parallel to the longitudinal axis, each sealing band configured to engage a corresponding longitudinal edge of the vane.

3. The method of claim 2, wherein the sealing bands have one of (i) a V-shaped edge adjacent a channel defined in the valve body operable to allow a flow to pass therethrough, (ii) a rectangular shaped edge, and (iii) an oval shaped edge.

4. The method of claim 2, wherein the first peripheral contact surface configured to engage the first bearing surface and the second peripheral contact surface configured to engage the second bearing surface are operable to contact accumulated combustion products disposed on an edge of the sealing bands.

5. The method of claim 1, wherein the shaft valve is operable to rotate unobstructed 360 degrees within the valving bore.

6. A valve assembly comprising:
   (a) a valve body having a gas passage bore, a valving bore extending along a longitudinal axis and intersecting the gas passage bore, a first annular bearing surface concentric with the longitudinal axis and a radially spaced apart second annular bearing surface concentric with the longitudinal axis, wherein an interface of the gas passage bore and the valving bore defines a flow port radially intermediate the first bearing surface and the second bearing surface; and
   (b) a shaft valve extending along the longitudinal axis and rotatably mounted in the valving bore, the shaft valve having a first peripheral contact surface configured to engage the first bearing surface, a second peripheral contact surface configured to engage the second bearing surface and a vane radially intermediate the first peripheral contact surface and the second peripheral contact surface, wherein the first and the second peripheral contact surfaces have a given diameter and the vane encompasses the given diameter and wherein rotation of the shaft valve relative to the valve body selectively permits flow through the gas passage bore, wherein the valve body defines a pair of opposing sealing bands extending parallel to the longitudinal axis, each sealing band configured to engage a corresponding longitudinal edge of the vane, and wherein the sealing bands have a sealing diameter that is greater than a length of the longitudinal edge of the vane, and wherein the shaft valve and the valve body are operable to prevent a flow of gas between the shaft valve and the valve body when the longitudinal edge of the vane is in contact with the sealings bands.

7. The valve assembly of claim 6, wherein the vane is defined by opposing recesses in the shaft valve.

8. The valve assembly of claim 6, wherein the vane is defined by opposite major surfaces, and at least a portion of the major surfaces are non-parallel.

9. The valve assembly of claim 6, wherein a thickness of the vane varies along a radius extending from the longitudinal axis.

10. The valve assembly of claim 6, wherein the vane has a cross section substantially perpendicular to the longitudinal axis defining non-parallel major surfaces.

11. The valve assembly of claim 6, wherein the vane has a cross section substantially perpendicular to the longitudinal axis defining a first thickness at a first radial location along the longitudinal axis and a different second thickness at a second radial location along the longitudinal axis.

12. The valve assembly of claim 6, wherein the sealing bands have one of (i) a V-shaped edge adjacent a channel defined in the valve body operable to allow a flow to pass therethrough, (ii) a rectangular shaped edge, and (iii) an oval shaped edge.

13. The valve assembly of claim 6, wherein the first peripheral contact surface configured to engage the first bearing surface and the second peripheral contact surface configured to engage the second bearing surface are operable to contact accumulated combustion products disposed on an edge of the sealing bands.

14. The valve assembly of claim 6, wherein the shaft valve is operable to rotate unobstructed 360 degrees within the valving bore.

15. The valve assembly of claim 6, wherein one of the valve body and vane has a shaped sealing surface that defines an opening cross sectional area that varies corresponding to an amount of rotation of the shaft valve operable to adjust flow rates through the gas passage bore relative to an angular position of the shaft valve.

\* \* \* \* \*